Aug. 23, 1932.　　　　F. W. GAY　　　　1,872,926
AUXILIARY MOTOR CONTROL SYSTEM
Filed Nov. 26, 1929
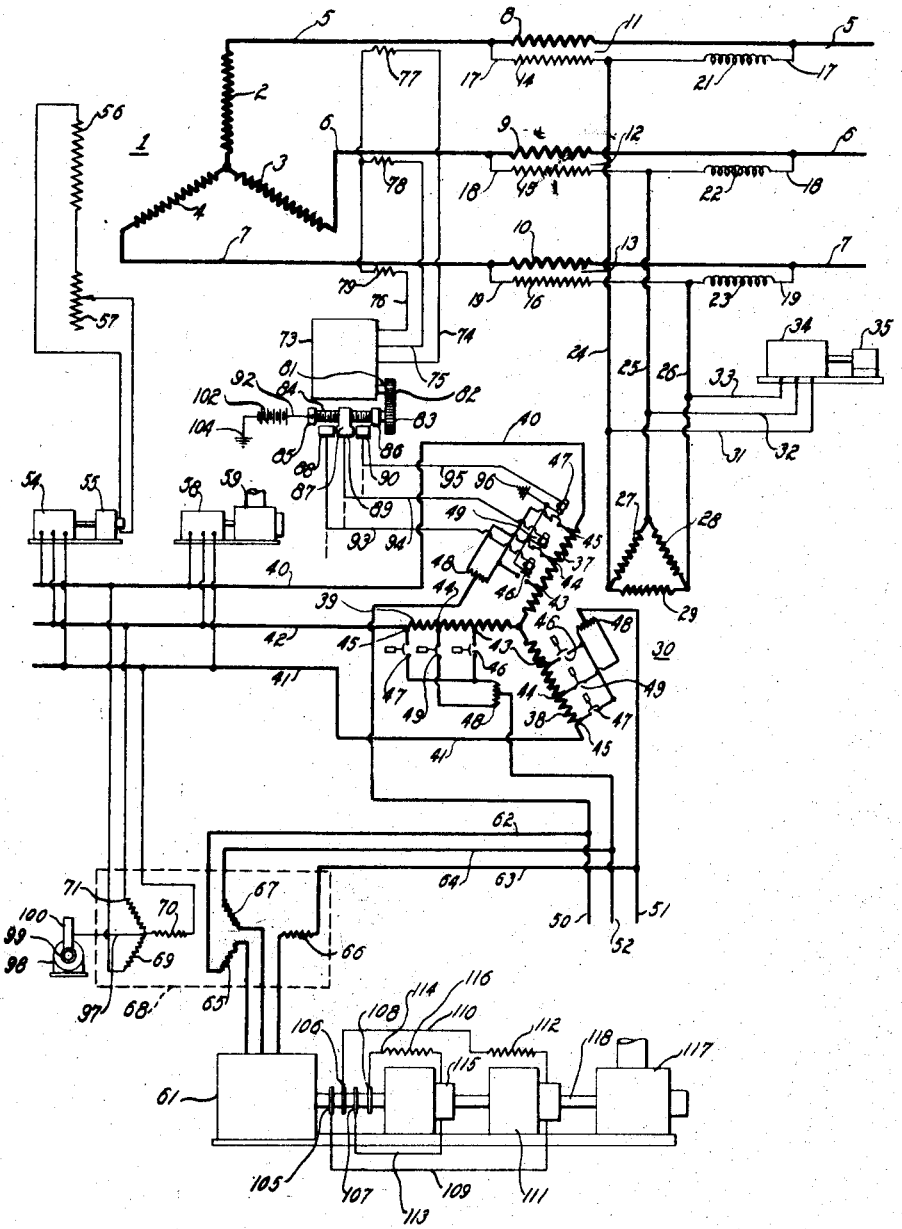
INVENTOR.
Frazer W. Gay
BY
George D. Richards
ATTORNEY.

Patented Aug. 23, 1932

1,872,926

UNITED STATES PATENT OFFICE

FRAZER W. GAY, OF NEWARK, NEW JERSEY

AUXILIARY MOTOR CONTROL SYSTEM

Application filed November 26, 1929. Serial No. 409,781.

This invention relates, generally, to electric motor control systems, and the invention has reference, more particularly to a novel control system for regulating the speed of motors driving the auxiliary equipment of turbo-generators.

In large modern power stations, the size of the individual turbo-generator unit is so great that each such unit has come to be considered as a separate power plant and is supplied with its own auxiliary power substation, boilers with their auxiliary fuel supply, induced and forced draft fans, condenser system, and exciter system.

The motors that drive the auxiliaries of turbo-generators may be arranged in two groups, i. e. one group which consists of motors which operate at substantially constant speed for all loads on the turbo-generator, such as motors driving exciters, condensers, and vacuum pumps, and a second group consisting of motors which must operate at speeds varying approximately in proportion to the load on the turbo-generator, such as boiler blowers. The first group of motors may be supplied with electric energy at a constant voltage such as that derived from the turbo-generator supply mains and these motors are preferably of the squirrel-cage induction type having double wound rotors. Patent applications, Serial Number 309,113 now Patent No. 1,843,920, and 303,145 now Patent No. 1,771,252, filed by me on Sept. 28, 1928 and Aug. 31, 1928 respectively, provide various means whereby a constant voltage may be obtained for these motors. The second group of motors have heretofore often been supplied from a constant voltage source also, and a variable speed obtained either by using induction motors having stator windings of varying numbers of poles, thereby obtaining as many speeds as there are stator windings, or by using slip ring induction motors and varying the resistance in the rotor circuit.

Both of the above means of speed control are open to the serious objection that the speed variation is a step by step operation and not uniform. Also, the use of a rotor resistance to control the speed variations is very inefficient, although it provides somewhat smaller increments of speed change than is possible with the use of multi-stator windings. In using either of the above means to obtain speed control it is customary to employ dampers to obtain accurate adjustment of the boiler air supply resulting in inefficient operation. Also the control means in such systems of control often cost more than the motors controlled.

The principal object of the present invention is to provide a motor control system adapted to cause the motors of the variable speed turbo-generator auxiliary equipment to vary the speed of such equipment in proportion to the load on the turbo-generator and to this end, motors having uniformly varying speed with uniformly varying voltage are employed.

In carrying out the invention in its preferred form, a transformer bank supplied from the turbo-generator is arranged to have its low tension windings supply constant voltage for the constant speed auxiliary motors of said turbo-generator, said low tension windings having a plurality of taps adapted to be connected independently to the supply circuit of the variable speed and auxiliary motors of said turbo-generator, and control means operated off of a watt meter connected in the output circuit of said turbo-generator for varying the tap connection of said low voltage winding with said supply circuit. A method for varying the power supply voltage of auxiliaries in response to load is disclosed in my previous application Serial Number 240,714 now Patent No. 1,744,879. filed Dec. 17, 1927.

Additional voltage control of said auxiliary variable voltage supply circuit is provided for obtaining the desired micrometer regulation necessary between the relatively coarse steps provided by the tap changing of the low tension transformer windings. This micrometer regulation is obtained by using induction regulators operating on each individual variable speed motor. The buck and boost coils of the regulator are connected in series with the variable speed induction motor stator windings and the variable voltage source while the shunt regulator windings may be connected either to the variable voltage source or preferably to the constant voltage source.

Another means of controlling the speed of the variable speed auxiliaries is by providing a constant voltage source capable of maintaining all of the motors in operation and then employing transformers having their primaries connected in series in the generator output circuit and their secondaries connected in series with the variable voltage bus and the constant voltage bus for boosting the voltage of the constant voltage source.

The rotor of each variable speed controlled load carrying induction motor is preferably wound with two phases and the leads of each phase connected across the terminals of a series A.C. motor. The induction motor rotor and both of the series motor armatures are mounted on a common shaft and this shaft is coupled to the variable speed auxiliary such as a blower by a flexible coupling. These motors are so connected that when polyphase current is applied to the stator of the induction motor, all motors contribute to drive the auxiliary.

Other objects of this invention, not at this time more particularly enumerated, will be clearly understood from the following detailed description of the same.

The invention is clearly illustrated in the accompanying drawing, the single figure of which is a wiring diagram of a turbo-generator equipped with the novel motor control system of this invention.

Referring now to the said drawing, the reference numeral 1 designates the generator of a turbo-generator unit provided with the novel control system of this invention. Generator 1 has phase windings 2, 3 and 4 which are respectively connected to load leads 5, 6 and 7. The primary windings 8, 9 and 10 of transformers 11, 12 and 13 are respectively connected in series in the leads 5, 6 and 7. One side of the secondary windings 14, 15 and 16 of these transformers are connected by leads 17, 18 and 19 respectively to one side of the primary windings 8, 9 and 10. The other side of secondary windings 14, 15 and 16 are connected by leads 17, 18 and 19 through reactors 21, 22 and 23 to the other side of the primary windings 8, 9 and 10. The secondary windings of transformers 11, 12 and 13 together with reactors 21, 22 and 23 and their connecting leads form circuits arranged in parallel with the primaries of these transformers.

Leads 24, 25 and 26 are tapped to leads 17, 18 and 19 intermediate the transformer secondary windings and the reactors and are connected to the primary windings 27, 28 and 29 of a transformer 30. Leads 31, 32 and 33 connect with leads 24, 25 and 26 and with a synchronous condenser 34 having an exciter 35. Synchronous condenser 34 acts to maintain the voltage on leads 24, 25 and 26 constantly at substantially a desired value.

The secondary windings 37, 38 and 39 of transformer 30 deliver power to the constant voltage power bus 40, 41 and 42. Bus 40, 41 and 42 is adapted to supply power to motors driving the constant speed auxiliaries of generator 1. Thus, by way of example, this bus is illustrated as connected to a constant speed motor 54 which is coupled in driving relation to an exciter 55 that serves to excite field winding 56 of generator 1. A resistance 57 is included in the circuit of exciter 55. Also, a motor 58, supplied from bus 40, 41 and 42, is illustrated as driving a fan 59 which is employed for cooling generator 1.

Each of the secondary windings 37, 38 and 39 are illustrated as having three spaced taps 43, 44 and 45. Taps 43 and 45 of each winding are connected through individual circuit breakers 46 and 47 to one side of an auto-transformer 48 associated with that winding, while tap 44 is connected through a circuit breaker 49 to the other side of auto-transformer 48. The mid-points of auto-transformers 48 are connected to supply electrical energy to the variable voltage bus 50, 51 and 52.

Circuit breakers 46, 47 and 49 are controlled in their operation by a wattmeter 73. Wattmeter 73 is connected by leads 74, 75 and 76 to the secondary windings of current transformers 77, 78 and 79 having their primaries in series in the load circuit leads 5, 6 and 7. Although not shown in the drawing, the potential leads of wattmeter 73 are connected to the usual unit potential transformers as is common practice and is well known to those skilled in the art. Wattmeter 73 has an operating shaft 81 with a pinion 82 thereon. Pinion 82 drives a fibre gear 83 mounted on a shaft 84 which is rotatably carried by electrically insulating bearings 85 and 86. The portion of shaft 84 that is between bearings 85 and 86 is threaded and carries a rider or brush 87 which is adapted to engage stationary contacts 88, 89 and 90. As the load varies on leads 5, 6 and 7 the wattmeter 73 operates shaft 81 to cause pinion 82 to drive gear 83 so that the rider 87 moves back and forth over contacts 88, 89 and 90.

Shaft 84 is electrically connected by a lead 92 to one terminal of a source of current 102, the other terminal of the source or battery 102 being grounded at 104. Contacts 88, 89 and 90 are connected respectively to corresponding terminals of the operating coils of circuit breakers 46, 49 and 47 associated with each of the secondary windings 37, 38 and 39 of transformer 30. Only leads 93, 94 and 95 connecting these contacts to the operating coils of circuit breakers 46, 49 and 47 associated with secondary winding 37 are shown in the drawing, the remaining similar leads being shown broken away so as to simplify the drawing. The remaining terminals of the operating coils of circuit breakers 46, 49 and 47 are grounded. This is also illustrated in connection with phase winding 37, wherein such remaining terminals of the circuit breaker operating coils are grounded at 96.

Bus 50, 51 and 52 is adapted to supply variable voltage to motors driving the variable speed auxiliary of generator 1. One such motor 61 of the wound rotor slip ring induction type is connected by leads 62, 63 and 64 to the variable voltage bus 50, 51 and 52. Buck and boost coils 65, 66 and 67 of an induction regulator 68 are included in series in leads 62, 63 and 64. The shunt coils 69, 70 and 71 of regulator 68 are illustrated as connected across constant voltage bus 40, 41 and 42. The shaft 97 of induction regulator 68 is operated in the usual manner by a motor 98 having a worm 99 driving a worm wheel 100 fixed on shaft 97.

The induction motor 61 has its rotor wound two phase, the terminals of one such phase being connected to slip rings 105 and 106 and the terminals of the other phase being connected to slip rings 107 and 108. Brushes contacting with slip rings 105 and 106 supply current through leads 109 and 110 to a series motor 111 having a field winding 112. Also, brushes contacting with slip rings 107 and 108 supply current through leads 113 and 114 to a second series motor 115 having a field winding 116. The rotor of induction motor 61 and the armatures of motors 111 and 115 are illustrated as being mounted on a common shaft 118 and although these motors are illustrated as separate units it is to be understood that they may be built into a single machine if desired. Induction motor 61 and series motors 111 and 115 drive a blower 117 which may be a draft fan for supplying air to one of the boilers furnishing steam to the turbine coupled to generator 1.

In operation, the auxiliaries of generator 1 generally consume in the neighborhood of seven percent of the output of this generator. The relative turns of the primary and secondary windings of transformers 11, 12 and 13 are so proportioned that at a predetermined load on generator 1, which ordinarily would be approximately eighty percent of full load, the magneto-motive force of the secondary windings will be exactly equal and opposite to that of the primary windings. At this predetermined load therefore, there is substantially no magnetic flux traversing the core of these transformers and the voltage across their primary windings 8, 9 and 10 is a minimum. As the load on the generator 1 increases above this predetermined load, the auxiliary circuit 24, 25 and 26 uses somewhat more current than would normally flow through the secondaries 14, 15 and 16 and this results in such additional current being supplied from leads 5, 6 and 7 through the reactors 21, 22 and 23. At light loads on generator 1, excess current flowing through the secondaries 14, 15 and 16 continues on through reactors 21, 22 and 23 back to the load leads 5, 6 and 7. Generator 1 produces current at a substantially constant voltage, and the synchronous condenser 34 together with its voltage regulating equipment acts to maintain the voltage on leads 24, 25 and 26 also substantially constant at all times. The secondary windings of transformer 30 will deliver current at substantially constant voltage to constant voltage bus 40, 41 and 42 supplying energy to motors 54 and 58.

Assuming the generator 1 to be started at no load and the load thereon gradually increased, then the wattmeter 73 will operate to move rider 87 from a point adjacent bearing 85 towards the right, as viewed in the figure of the drawing. Thus, as the load commences to increase, rider 87 will initially engage contact 88 causing current to flow from battery 102 through lead 92, shaft 84, rider 87, contact 88, lead 93 and the operating coil of circuit breaker 46 to the ground 96 from whence it flows back to the battery 102 by way of ground 104. The operating coil of circuit breaker 46 being energized, results in the closing of this breaker, thereby causing a portion of the secondary phase winding 37 of transformer 30 to be connected through auto-transformer 48 to variable voltage lead 50. The lead 50 will assume the voltage existing at tap 43 of phase winding 37. Similarly, variable voltage leads 51 and 52 will assume the voltage of the taps 43 of their respective phase windings.

Since the portions of the secondary windings of transformer 30 extending between taps 43 and the neutral point of these windings are relatively small, a corresponding relatively low voltage will be developed within these portions of the windings so that as the load on the generator initially starts to increase, a relatively low voltage is impressed upon the variable voltage bus 50, 51 and 52. A low voltage is therefore impressed on leads 62, 63 and 64 connected to induction motor 61, causing this motor to operate at a low speed. Although the voltage across the slip rings 105 and 106, 107 and 108 would tend to be high at this time by reason of the relatively great slip of the rotor of induction motor 61, nevertheless, since the voltage impressed on the stator of this motor is low, the voltage impressed on series motors 111 and 115 is also relatively low so that these motors take but little current and deliver but little torque to shaft 118, resulting in relatively slow speed of blower 117.

As the load on generator 1 increases, rider 87 moves toward the right along shaft 84 and engages contact 89 in addition to contact 88, causing the current from the source 102 to divide, passing partially through lead 94, so that the operating coils of circuit breakers 46 and 49 are both energized, resulting in the lead 50 assuming a voltage which is midway between that of taps 43 and 44 which is also true of lead 51 and 52. This causes an increase in the voltage impressed on these variable voltage leads, resulting in an increase in speed of motor 61 and of motors 111 and 115. Further increase in load on generator 1 causes rider 87 to engage solely with contact 89, resulting in the energization of the operating coil of circuit breaker 49 only, thereby raising the voltage of variable voltage leads 50, 51 and 52 to that of taps 44 and causing a further increase in the speed of motors 61, 111 and 115. Further increase in load on generator 1 causes rider 87 to engage contactors 89 and 90, resulting in the energization of the operating coils of circuit breaker 49 and 47, causing the variable voltage leads to assume a voltage intermediate that of taps 44 and 45, thereby causing further increase in speed of the motors 61, 111 and 115 and consequently of blower 117. When the generator 1 is operating at full load, rider 87 will engage solely with contact 90, causing energization of the operating coil of circuit breaker 47 and impressing on the variable voltage leads 50, 51 and 52 the maximum voltage output of the secondary windings of transformer 30 and resulting in a maximum speed of motors 61, 111 and 115.

It will be noted that rider 87 acts to increase the speed of the motors driving blower 117 in steps, and in order to obtain a uniform increase in speed of these motors the induction regulator 68 is depended upon. By operating motor 98 of this induction regulator either by hand operation or by suitable automatic means, the voltage on stator windings 65, 66 and 67 may be varied up or down in the usual manner. The amount of voltage regulation that may be obtained from induction regulator 68 would ordinarily be limited to approximately twenty per cent of the rating of motor 61 which is ample to obtain an uniform increase in the speed of blower 117 with an uniform increase in load on the generator.

Thus it will be noted that at light loads, the volume of air required by the boilers is relatively small and blower 117 must operate at a low speed, which result is obtained by using the novel control system of this invention. At low speeds, motor 61 acts largely as a transformer and its stator takes but little current and its rotor will deliver current to the series motors 111 and 115, resulting in a high over-all efficiency of motors 61, 111 and 115. As the load on the generator increases, the speed of blower 117 increases proportionately and current delivered by the rotor of motor 61 is consumed in driving series motors 111 and 115 at greater and greater speeds as desired.

It is to be understood that the conventional method of varying voltage on variable voltage busses may also be used if desired for controlling the voltage on bus 50, 51 and 52. This is accomplished by using an induction regulator to buck and boost the voltage taken from mid taps, for example, taps 44 of transformer 30. When using this conventional induction regulator system, the voltage on variable voltage bus 50, 51, and 52 may be caused to vary uniformly with load on generator 1.

As many changes could be made in the above construction and many apparatently widely different embodiments of this invention could be made without departing from the scope thereof, it is intended that all matter contained in the above description or shown in the accompanying drawing shall be interpreted as illustrative and not in a limiting sense.

What is claimed is:—

1. In combination, a turbo-generator and auxiliaries therefor, induction motors driving the auxiliaries of said turbo-generator, one of said induction motors having a variable speed responsive to variations in voltage impressed on said motor, alternating current transformer means for supplying operating power to said auxiliary motors, and means connected to the output of said turbo-generator and in operative relation to said transformer means for causing the voltage on said variable speed motor to vary in accordance with the load on said turbo-generator.

2. In combination, a turbo-generator having induction motor driven auxiliaries and a control system for controlling the motors of said auxiliaries, said control system comprising, transformer means connected to said turbo-generator and arranged to supply alternating current at a substantially fixed voltage to the motor of one of said auxiliaries, and means responsive to load changes on said generator for causing said transformer means to supply current to the motor of a second of said auxiliaries at voltages varying approximately proportionally to the load on said generator.

3. In combination, a turbo-generator having induction motor driven auxiliaries and a control system for controlling the motors of said auxiliaries, said control system comprising, transformer means connected to said turbo-generator and arranged to supply alternating current at a substantially fixed voltage to the motor of one of said auxiliaries, means responsive to load changes on said generator for causing said transformer means to supply current to the motor of a second of said auxiliaries at voltages varying in steps approximately proportionally to the load on said generator, and regulator means connected to the motor of said second named auxiliary and adapted for controlling the voltage thereon, whereby the speed of said second named auxiliary may be caused to vary proportionally to the load on said turbo-generator.

4. In combination, a turbo-generator having motor driven auxiliaries and a control system for controlling the motors of said auxiliaries, said control system comprising, a transformer connected to said turbo-generator and arranged to supply alternating current at a substantially fixed voltage to the motor of one of said auxiliaries, said transformer having a secondary winding provided with a plurality of taps and means responsive to the load on said turbo-generator for causing said taps to be selectively connected to the motor of a second of said auxiliaries, whereby the voltage impressed on said motor is caused to vary approximately proportionally to the load on said turbo-generator.

5. In combination, a turbo-generator and auxiliaries therefor, motors for driving said auxiliaries, one of said motors being an induction motor having a wound rotor of a plurality of phases, a plurality of alternating current series motors mechanically connected to said wound rotor and to one of said auxiliaries, each of said series motors being connected to receive electric energy from a phase of said rotor winding, said series motors cooperating with said induction motor to drive said auxiliary and variable ratio transforming means for effecting variations in the voltage supplied to said series motors.

6. In combination, a turbo-generator and auxiliaries therefor, motors for driving said auxiliaries, one of said motors being an induction motor having a wound rotor, a plurality of series alternating current motors connected to one of said auxiliaries, and connections extending from the rotor windings of said induction motor to said series motors to cause the output energy of said rotor to operate said series motors and effect the driving of said connected auxiliary and variable ratio transforming means connected to said induction motor for effecting variations in the voltage supplied to said series motors in accordance with variations in load on said turbo-generator.

7. In combination, a turbo-generator and auxiliaries therefor, alternating current motor units mechanically connected together in driving relation to one of said auxiliaries, means connected to the output of said turbo-generator for effecting variation of the voltage impressed on one of said alternating current motor units in response to variations in load on said turbo-generator and additional means connected to said one alternating current motor unit for making minor adjustments in the voltage impressed thereon.

8. In combination, a turbo-generator and auxiliaries therefor, electric motors for driving said auxiliaries, said motors having speeds responsive to the voltage impressed upon them, means for simultaneously varying the voltage on said motors in proportion to the load on said turbo-generator, and additional means for making minor variations in the voltage on one of said motors independently of the load on said turbo-generator.

In testimony, that I claim the invention set forth above, I have hereunto set my hand, this 20th day of November, 1929.

FRAZER W. GAY.